US012761164B2

(12) United States Patent
Song et al.

(10) Patent No.: US 12,761,164 B2
(45) Date of Patent: Oct. 13, 2026

(54) PDMS (POLY(DIMETHYL SILOXANE))-BASED ANALYSIS METHOD OF COSMETIC FILM FORMULATION

(71) Applicants: AMOREPACIFIC CORPORATION, Seoul (KR); RESEARCH & BUSINESS FOUNDATION SUNGKYUNKWAN UNIVERSITY, Suwon-si (KR)

(72) Inventors: Chaeyeon Song, Yongin-si (KR); Marta Goncalves, Suwon-si (KR); Byung Mook Weon, Jung-gu (KR); Youngkyu Han, Yongin-si (KR)

(73) Assignees: AMOREPACIFIC CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 127 days.

(21) Appl. No.: 18/821,092

(22) Filed: Aug. 30, 2024

(65) Prior Publication Data

US 2025/0076223 A1 Mar. 6, 2025

(30) Foreign Application Priority Data

Sep. 1, 2023 (KR) ........................ 10-2023-0116044
Aug. 27, 2024 (KR) ........................ 10-2024-0115038

(51) Int. Cl.

| | |
|---|---|
| ***G01N 23/046*** | (2018.01) |
| ***G01B 15/06*** | (2006.01) |
| ***G01N 1/28*** | (2006.01) |

(52) U.S. Cl.

CPC ........... *G01N 23/046* (2013.01); *G01B 15/06* (2013.01); *G01N 1/2813* (2013.01); *G01N 2223/61* (2013.01)

(58) Field of Classification Search

CPC .... G01B 15/06; G01N 1/2813; G01N 23/046; G01N 2223/61

See application file for complete search history.

(56) References Cited

U.S. PATENT DOCUMENTS

| | | | | |
|---|---|---|---|---|
| 2016/0213269 | A1* | 7/2016 | Lam | A61B 5/25 |
| 2017/0252488 | A1* | 9/2017 | Nosrati | A61F 13/05 |
| 2018/0095067 | A1* | 4/2018 | Huff | G01N 33/48721 |

FOREIGN PATENT DOCUMENTS

| | | | | |
|---|---|---|---|---|
| KR | 10-2015-012594 A | 11/2015 | | |
| KR | 10-2015-0125946 A | 11/2015 | | |
| WO | 2014/124044 A1 | 8/2014 | | |
| WO | WO-2023137032 A1 * | 7/2023 | | C12N 5/0657 |

* cited by examiner

*Primary Examiner* — Mark R Gaworecki
(74) *Attorney, Agent, or Firm* — Merchant & Gould P.C.

(57) ABSTRACT

Disclosed in the present specification is a technology for quantifying properties of a cosmetic film formulation using a cosmetic film applied on a polymeric substrate having physical properties similar to skin, and for quantifying the degree of deformation due to application of a cosmetic composition using a non-destructive analysis technique through X-ray CT, thereby objectively quantifying the degree of pulling of the cosmetic film using this technology.

15 Claims, 11 Drawing Sheets

Parameters

- $H_d$ : Height of pillar
- $D_d$ : Diameter of the pillar
- $T_t$ : Height of foundation coverage on pillar top
- $T_v$ : Height of foundation coverage on the valley

PDMS (POLY(DIMETHYL SILOXANE))-BASED ANALYSIS METHOD OF COSMETIC FILM FORMULATION

CROSS REFERENCE TO RELATED APPLICATION

The present application claims priority to Korean Patent Application Nos. 10-2023-0116044 filed on Sep. 1, 2023 and 10-2024-0115038 filed on Aug. 27, 2024, the entire contents of which is incorporated herein for all purposes by this reference.

BACKGROUND OF THE INVENTION

Field of the Invention

The present specification relates to a method of analyzing a cosmetic film formulation that quantifies the degree of substrate deformation caused by a cosmetic film that is applied to a polymeric substrate using a polymeric substrate having physical properties similar to skin, using a non-destructive analysis technique through X-ray computed tomography (X-ray CT).

Description of the Related Art

There was no existing technology to quantify the degree of skin deformation or skin pulling caused by a cosmetic film according to a conventional formulation, and there have been some cases of judging or quantifying the subjective degree of pulling from an expert panel or customers.

This subjective evaluation is subject to individual differences, as each user has a different reference point for feeling the degree of pulling, even if systematic training is carried out with the panel or customers. Further, environmental factors (fatigue, weather, and the like) affect the result values, which makes it possible to make relative comparisons between products, but it is difficult to trust absolute values.

Therefore, there is a need for the development of technologies that are capable of quantifying changes in properties of a cosmetic film formulation.

SUMMARY OF THE INVENTION

One aspect of the present disclosure is directed to providing an objective method of evaluating a cosmetic film formulation, using a PDMS substrate that has similar strength (or elasticity, stiffness) to real skin.

One aspect of the present disclosure is directed to providing a method of quantifying properties of a cosmetic film formulation by non-destructively analyzing a sample through X-ray CT.

In one aspect, the present specification provides a PDMS (poly(dimethyl siloxane))-based method of analyzing a cosmetic film formulation, the method including: preparing a PDMS substrate; applying a cosmetic composition to the PDMS substrate to form a cosmetic film; and analyzing, using X-ray CT, a degree of deformation of the PDMS substrate on which the cosmetic film is formed.

A method according to one aspect of the present disclosure can objectively quantify a degree of pulling of a cosmetic film.

A method according to one aspect of the present disclosure can non-destructively analyze a cosmetic film formulation.

DETAILED DESCRIPTION OF THE INVENTION

Hereinafter, the present disclosure will be described in more detail with reference to the following embodiments. However, the following embodiments are provided for illustrative purposes only to assist in understanding the present disclosure and are not intended to limit the scope and range of the present disclosure.

In the present specification, unless explicitly described to the contrary, the word "comprise" or "include" and variations, such as "comprises", "comprising", "includes" or "including", will be understood to imply the inclusion of stated constituent elements, not the exclusion of any other constituent elements.

Hereinafter, the present disclosure will be described in detail.

In exemplary implementations of the present disclosure, there is provided a PDMS (poly(dimethyl siloxane))-based method of analyzing a cosmetic film formulation, the method including: preparing a PDMS substrate; applying a cosmetic composition to the PDMS substrate to form a cosmetic film; and analyzing, using X-ray CT, a degree of deformation of the PDMS substrate on which the cosmetic film is formed.

Figure 1:
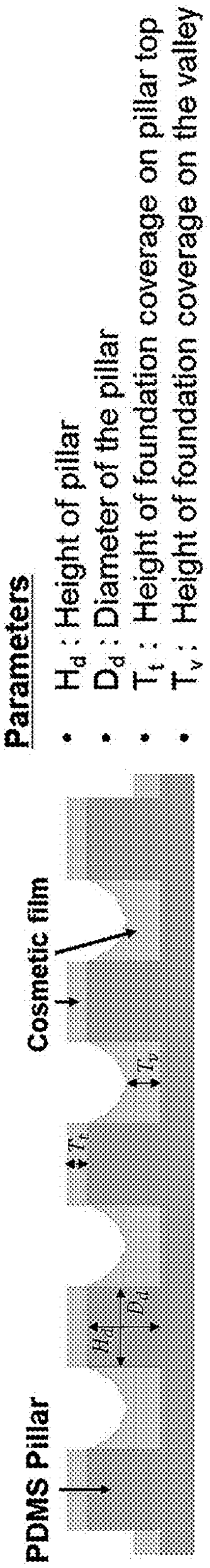
FIG. 1 is a schematic view according to one implementation of the present disclosure, when a cosmetic film is applied to a PDMS substrate to which a micropillar pattern (micropillar array) is applied.
Figure 5A:
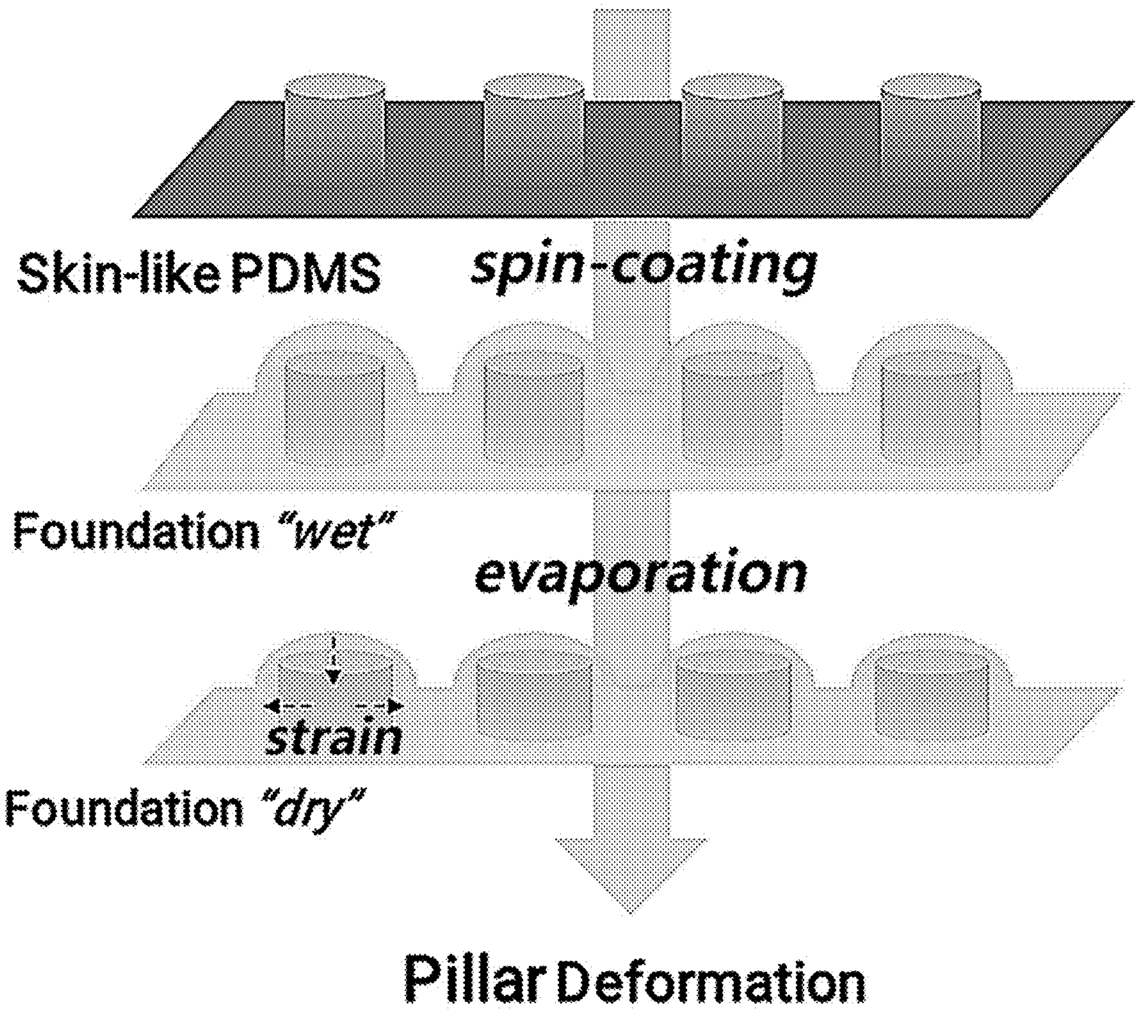
FIG. 5A is a schematic view illustrating a micropillar pattern PDMS artificial skin model according to one implementation of the present disclosure and pressure (strain) generated on a pillar by a cosmetic film (foundation) coating.

According to the present disclosure, the degree of deformation of a substrate caused by a cosmetic film applied on a polymeric substrate (PDMS (poly(dimethyl siloxane))) having skin-like physical properties may be quantified using a non-destructive analysis technique through X-ray CT, and the degree of pulling of the cosmetic film may be quantified by measuring the cosmetic film coverage or the degree of deformation of the PDMS. (See FIG. 1 and FIG. 5A) In one implementation, the PDMS substrate may be one with a micropillar pattern formed on an upper portion thereof.

According to the present disclosure, the properties of a cosmetic film formulation may be evaluated similarly to the evaluation of a cosmetic film on real skin, by forming a micropillar pattern (micropillar array) to take the role of wrinkles and pores on the PDMS substrate having a similar strength (or elasticity, stiffness) as real skin.

In one implementation, the micropillar may be in the form of grooves (valleys) between pillars, but there is no particular limitation on the shape of each pillar. Each of the pillars may be radially arranged at a predetermined distance from each other, for example, the pillars may be arranged to have an equal interval between the pillars.

In one implementation, the micropillar pattern is a regular hexagonal arrangement of columnar pillars, each of which may have a height of 20 to 200 μm and a diameter of 20 to 200 m.

In one implementation, the interval between pillars of the micropillar pattern may be 50 to 500 μm.

For example, the height may be 20 μm or more, 50 μm or more, 100 μm or more, or 150 m or more, and may be 200 μm or less, 150 μm or less, 100 μm or less, or 50 μm or less.

For example, the diameter may be 20 am or more, 50 μm or more, 100 μm or more, or 150 μm or more, and may be 200 μm or less, 150 μm or less, 100 μm or less, or 50 μm or less.

For example, the interval may be 50 μm or more, 100 μm or more, 200 μm or more, or 300 μm or more, and may be 500 μm or less, 400 μm or less, 300 μm or less, or 200 μm or less.

For example, the height*diameter*interval of the pillar may be 100 μm*100 μm*100 μm.

In one implementation, the cosmetic composition may include one or more forms of a liquid, a powder, and a solid.

In one implementation, the degree of pulling of the cosmetic film may be quantified in a step of analyzing the degree of deformation of the PDMS substrate.

In one implementation, the analysis may be performed by transmitting X-rays of 10 KeV or more in the step of analyzing the degree of deformation of the PDMS substrate.

For example, the degree of deformation of the PDMS substrate may be analyzed by transmitting X-rays of 10 KeV or more, or 300 KeV or more, in the present disclosure.

When X-rays of 10 KeV or less are transmitted, the resolution may be degraded. That is, lowering the intensity may decrease the ability to penetrate the PDMS, and only a top portion of the PDMS may be measured, while a valley area may not be measured.

However, the measurement may be performed by transmitting various ranges of X-rays, depending on the PDMS thickness variation or sample size adjustment.

For example, samples of the cosmetic composition may be applied to the PDMS substrate on which a micropillar pattern similar to the characteristics of real skin is formed, rotated 180 degrees and subjected to X-rays transmitting with an energy of 30 keV or more (or 10 keV or more) to take two-dimensional longitudinal images at predetermined angles, and the images are combined through a computer program to form a three-dimensional image.

Then, a desired portion of the three-dimensional image obtained as described above may be cut out through the program, and the cross-section thereof may be observed, and the degree to which the sample is applied or the thickness and the like may be visually identified.

In one implementation, in the step of analyzing the degree of deformation of the PDMS substrate, a thickness of the cosmetic composition applied to a top of the pillar; and a thickness of the cosmetic composition applied to a valley between the pillars may be measured.

Figure 2A:
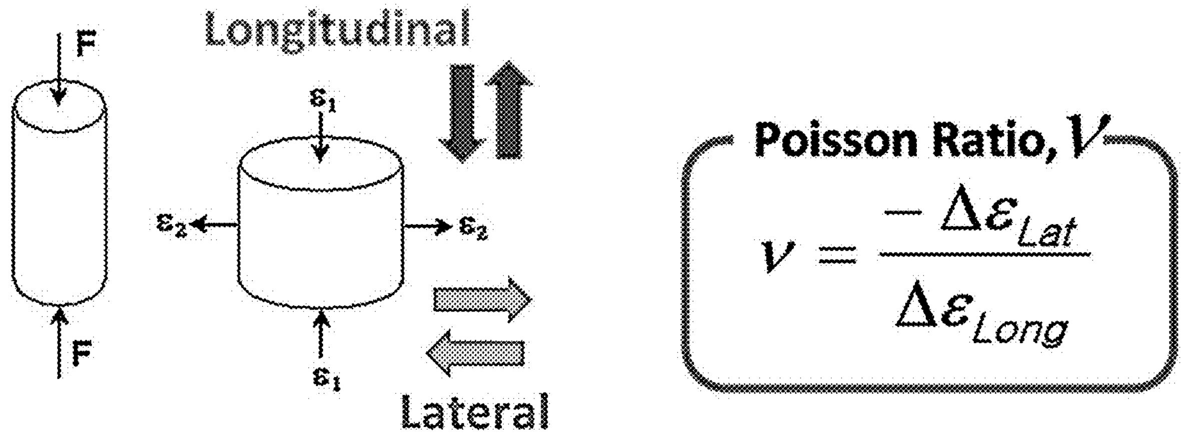
FIG. 2A is a schematic view of Equation 1 (Poisson's ratio) according to one implementation of the present disclosure.
Figure 2B:
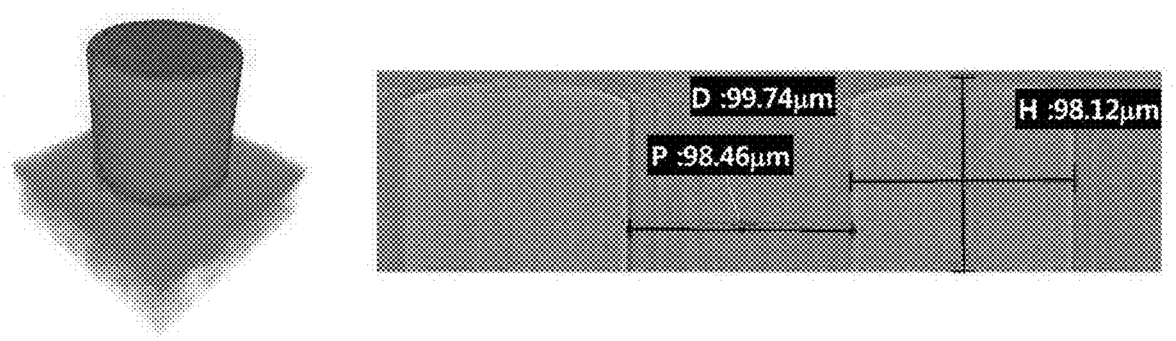
FIG. 2B is an X-ray tomographic image of PDMS with a micropillar pattern applied, according to one embodiment of the present disclosure.

In one implementation, in the step of analyzing the degree of deformation of the PDMS substrate, a strain value (v) may be calculated according to Equation 1 below. (See FIG. 1 and FIGS. 2A to 2B)

$$v = -\varepsilon_{lateral} / \varepsilon_{longitudinal} \qquad \text{[Equation 1]}$$

In Equation 1, $\varepsilon_{longitudinal}=(H_d-H_0)/H_0$, $\varepsilon_{lateral}=(D_d-D_0)/D_0$, $D_0$ is a diameter value of a pillar before cosmetic film formation, $H_0$ is a height value of a pillar before cosmetic film formation, $D_d$ is a diameter value of a pillar after cosmetic film formation, and $H_d$ is a height value of a pillar after cosmetic film formation.

In the equation above, $D_0$ and $H_0$, the values of the pillar before the cosmetic film is formed, are the same with little error, because the height and diameter values of an initial pillar are almost the same by a method of printing the pillar by a pattern.

However, $D_d$ and $H_d$, the values after the cosmetic film is formed, may be inserted as data by quantifying all the values of the pillars in consideration that the amount of cosmetic film applied is different, causing different strain values for each position.

For example, the $D_d$ or $H_d$ value may be quantified using a user imaging analysis program located within an accelerator and Avizo Software.

In still other exemplary implementations of the present disclosure, artificial skin for cosmetic film formulation analysis is provided, which includes a PDMS (poly(dimethyl siloxane)) substrate with a micropillar pattern formed on an upper portion thereof.

In one implementation, the micropillar pattern is a regular hexagonal arrangement of columnar pillars, each of which may have a height of 20 to 200 μm and a diameter of 20 to 200 km.

In one implementation, the cosmetic film formulation analysis may be applying the cosmetic composition to the artificial skin and then analyzing the degree of deformation of the PDMS substrate on which the cosmetic film is formed using X-ray CT.

In one implementation, the cosmetic composition may include one or more forms of a liquid, a powder, and a solid.

In one implementation, the cosmetic film formulation analysis may be quantifying the degree of pulling of the cosmetic film.

In one implementation, the cosmetic film formulation analysis may be analyzing the cosmetic film formulation by transmitting X-rays of 10 KeV or more.

In one implementation, the cosmetic film formulation analysis may be measuring and analyzing a thickness of the cosmetic composition applied to a top of the pillar; and a thickness of the cosmetic composition applied to a valley between the pillars.

In one implementation, the cosmetic film formulation analysis may be calculating and analyzing a strain value (v) according to Equation 1 below.

$$v = -\varepsilon_{lateral} / \varepsilon_{longitudinal} \quad \text{[Equation 1]}$$

In Equation 1, $\varepsilon_{longitudinal}=(H_d-H_0)/H_0$, $\varepsilon_{lateral}=(D_d-D_0)/D_0$, $D_0$ is a diameter value of a pillar before cosmetic film formation, $H_0$ is a height value of a pillar before cosmetic film formation, $D_d$ is a diameter value of a pillar after cosmetic film formation, and $H_d$ is a height value of a pillar after cosmetic film formation.

Hereinafter, the present disclosure will be described in more detail with reference to the embodiments. These embodiments are just illustrative of the present disclosure, and it is apparent to one of ordinary skill in the art that the scope of the present disclosure is not to be interpreted as limited by these embodiments.

Embodiment (1) Experimental Materials and Method

Artificial Skin Substrate

For this study, a micropillar patterned substrate was manufactured to mimic a skin surface. A substrate was manufactured from poly(dimethyl siloxane) (PDMS) using the SYLGARD™ 184 silicone elastomer kit (Dow, USA). A polymer base and a hardener were mixed in a ratio of 20:1 to obtain a stiffness in the same range as the real skin strength (about 210 kPa). The polymer mixture was poured into a silicon master mold with a design of columnar pillars of diameter (D)=100 μm, height (H)=100 μm, and pitch (interval) (P)=100 μm arranged in a hexagonal pattern. The polymer was cured in a 75° C. convection oven for four hours and then gently peeled off the master mold. The resultant substrate has hydrophobic properties, which is an essential characteristic since mammalian skin is also hydrophobic. The micropillar contributes to creating the skin's natural wrinkles and pore-like roughness.

Application of Cosmetic Samples

Figure 6A:
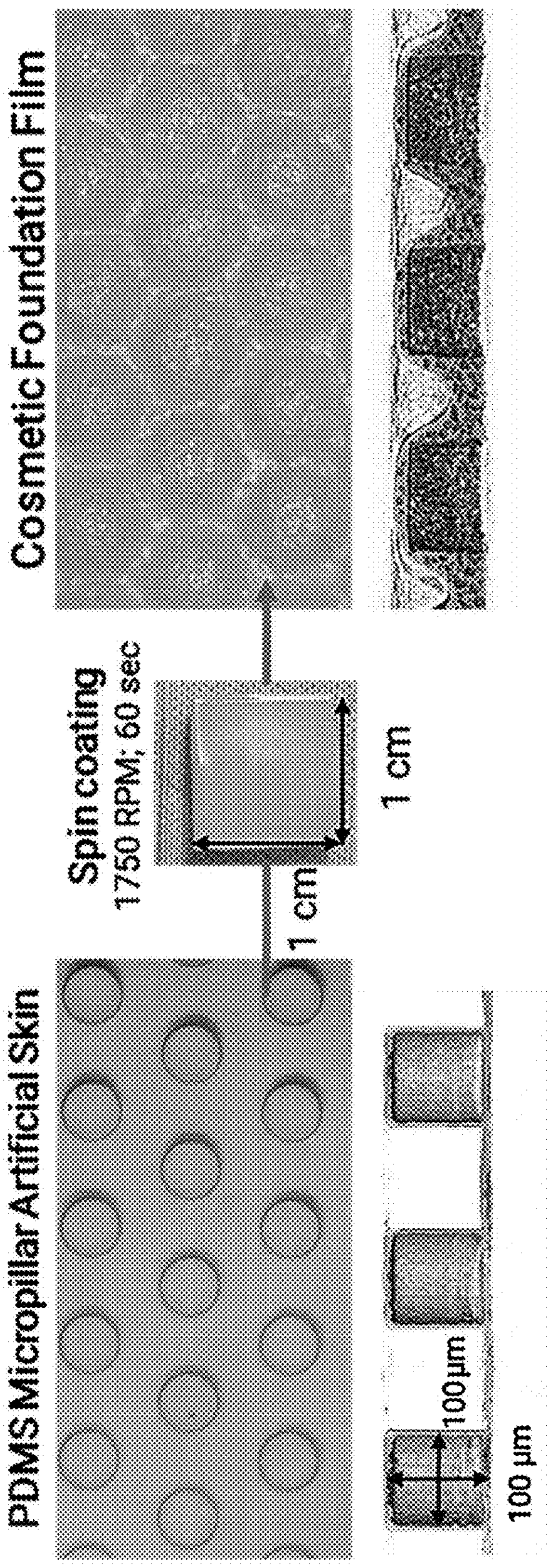
FIG. 6A is an optical micrograph of a micropillar artificial skin before and after foundation spin coating according to one embodiment of the present disclosure, showing that a cosmetic film is deposited on a micropillar structure.

In this study, various foundation formulations were analyzed to quantitatively compare cosmetic film deposition. In the study, samples of products #01, #04, #10, and #11 were tested. The micropillar artificial skin was cut into 1 cm×1 cm squares and a basic material was applied with a spin-coater at 1750 RPM for 60 seconds. Spin coating is a standard method for obtaining a thin film deposition that is similar to the coverage expected when the foundation is applied to the real skin surface (FIG. 6A). #01 and #04 are commercially available products, and #10 and #11 are prototypes with the same ingredients as the commercially available product in #01.

X-Ray Microtomography

To characterize and differentiate various foundation samples, we proposed a quantitative analysis of cosmetic coating using X-ray computed tomography. The synchrotron source X-ray imaging experiment was performed at the Pohang Light Source II (PLS-II) using the 6C biomedical imaging (BMI) beamline. The instrument has the equipment to achieve phase contrast imaging using hard X-rays (λ~0.1 nm), which is an advantageous feature for the visualization of thick opaque media. The beam used has a feature of monochromatic X-rays set at a high energy of 37 keV for complete imaging of the micropillar structure and deposited cosmetic film.

Figure 5B:
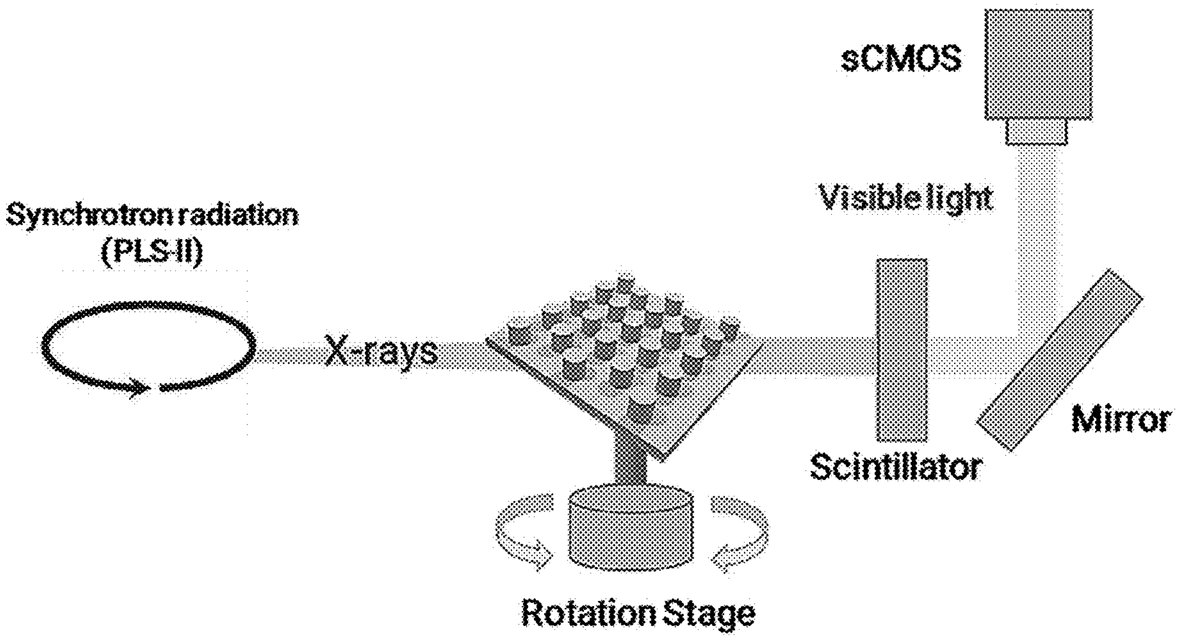
FIG. 5B is a schematic view of an image collection process of an X-ray CT imaging technique according to one implementation of the present disclosure.

As schematically illustrated in FIG. 5B, the sample disposed on the rotation stage was transmitted by X-rays converted to visible light by the scintillator (LuAG:Ce 50 μm) and later received by a scientific complementary metal-oxide-semiconductor (sCMOS) camera (pco.edge). All experiments were performed at 10× magnification, which provides a large field of view of 1.70×1.40 $mm^2$ (pixel size: 0.65 μm).

Figure 5C:
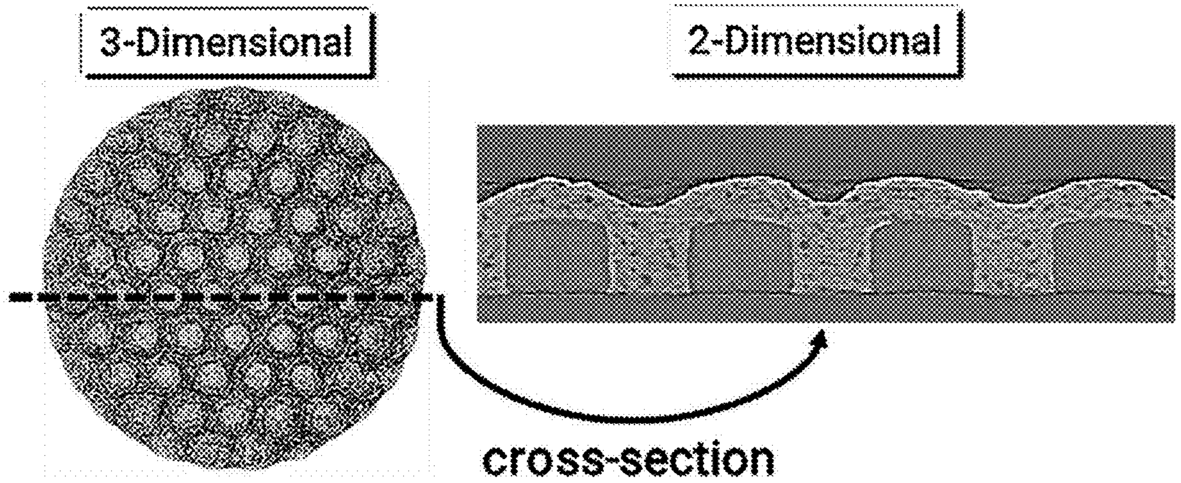
FIG. 5C is a cross-section of a micropillar covered with a cosmetic film (foundation) according to one implementation of the present disclosure, and an example of a three-dimensional reconstruction of a sample.

X-ray computed tomography (CT) was taken for three-dimensional analysis of the sample. While the sample is rotated from 0 to 180 degrees, a two-dimensional projection image is recorded and converted into a two-dimensional tomographic slice using the Octopus Reconstruction program (Octopus, Belgium). Then, the two-dimensional slice was used to reconstruct the three-dimensional sample using Avizo visualization software (Thermo Fisher Scientific, USA), and both the three-dimensional reconstruction and the two-dimensional cross-section were observed from multiple directions (FIG. 5C).

Figure 6B:
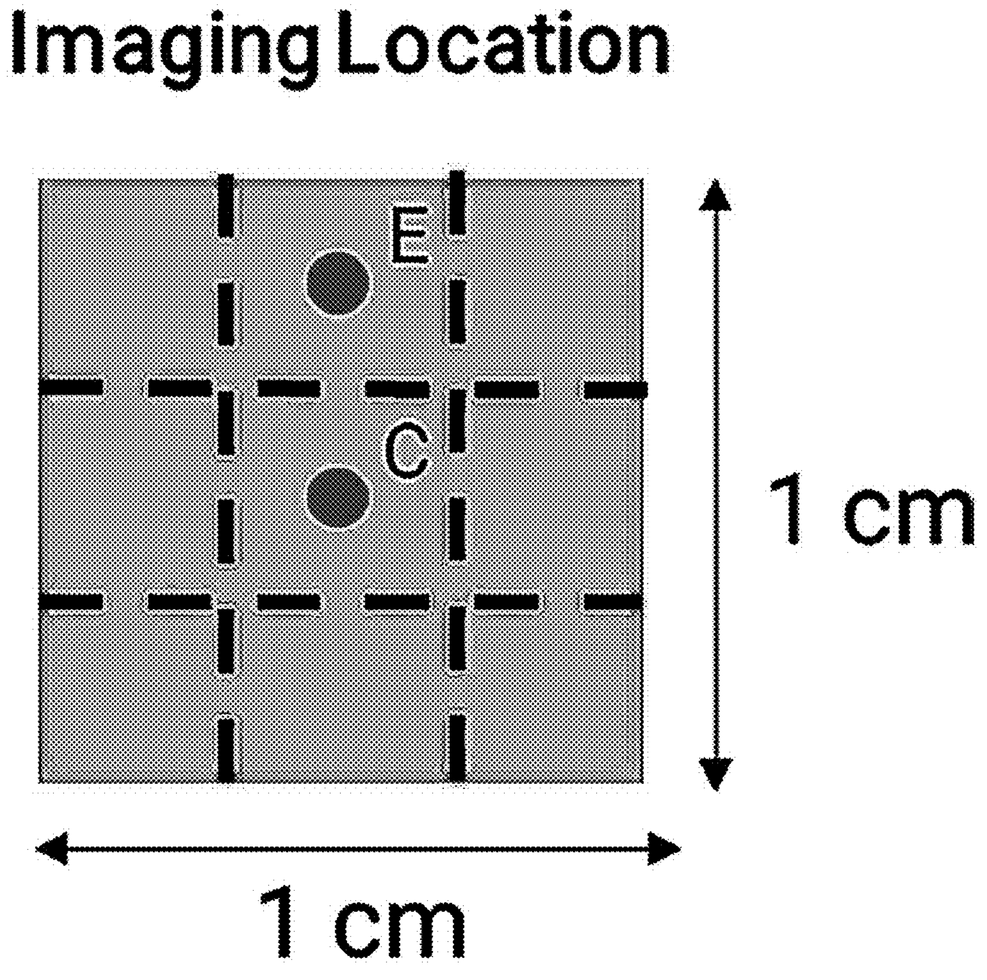
FIG. 6B illustrates an imaging position of a sample according to one embodiment of the present disclosure, showing a center C and an edge E of a cosmetic film.

The sample was imaged at two locations. One is in the center of the cosmetic film deposition and the other is at the edge of the cosmetic film (FIG. 6B). For each sample, the parameters analyzed in the three-dimensional reconstruction are illustrated at the center and edge positions in FIG. 1.

For the analysis of the cosmetic foundation film (membrane), two parameters, which are a thickness Tt of a cosmetic material deposited on the top of the pillar and a thickness Tv of a cosmetic material deposited in the valley between the pillars, were measured.

The dimensions of the deformed micropillar of a diameter Dd of the deformed pillar and a height $H_d$ of the deformed pillar were also measured to identify the stresses exerted on the artificial skin due to the cosmetic film deposition. A total of 15 measurements were made for each parameter at each location and sample. With the three-dimensional microtomographic analysis, the sample dimensions may be precisely measured and the thickness of the cosmetic film and the deformation that has occurred may be identified.

(2) Side View of Samples after Cosmetic Film Application

Figure 3:
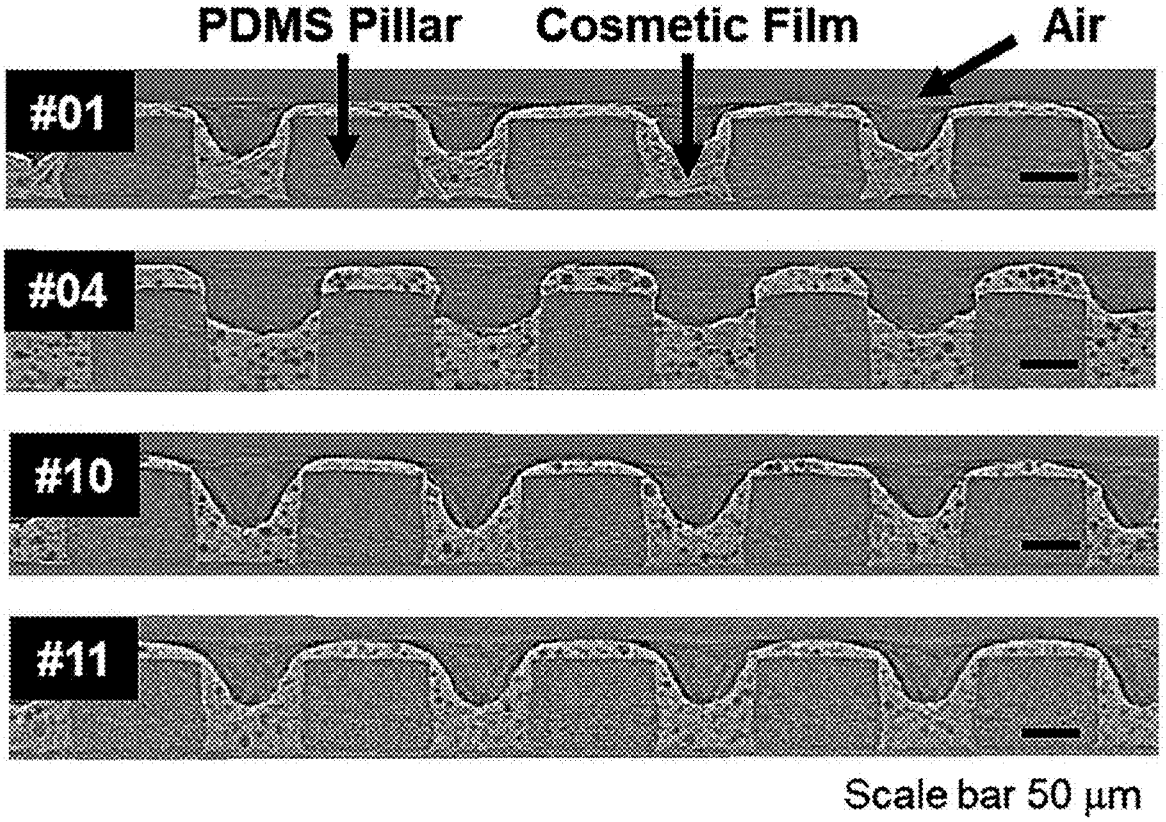
FIG. 3 is a cross-sectional view (side view) of samples of #01, #04, #10, and #11 taken by X-ray CT, according to one embodiment of the present disclosure.

With reference to FIG. 3, X-ray CT taken cross-sections (center side view) of samples #01, #04, #10, and #11 manufactured in (1) can be seen.

With reference to this, it was possible to obtain a two-dimensional or three-dimensional image indicating the internal structure or density of the cosmetic film for each manufactured sample, and it was confirmed that formulations #01, #10, and #11, which contain the same ingredients, have a similar coverage form of the cosmetic film, while #04, which is the representative formulation of our company and contains different ingredients, has a different coverage form from the remaining three samples through the cross-sectional view.

(3) Cosmetic Film Coverage

Figure 4A:
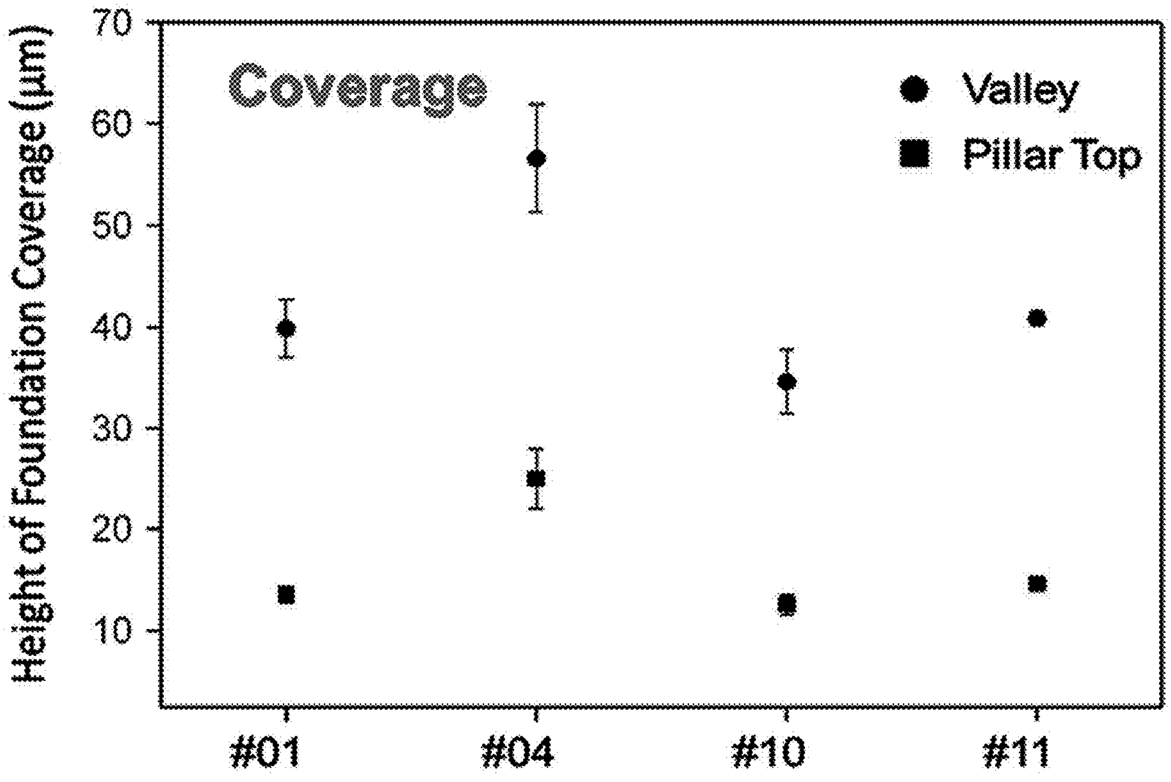
FIG. 4A is a result of measuring cosmetic film coverage obtained through a cross-sectional slice of an X-ray CT image according to one embodiment of the present disclosure.

As illustrated in FIG. 4A, the thickness of the cosmetic material deposited on the top of the pillars (Tt, Pillar Top) and the thickness of the cosmetic material deposited in the valley between the pillars (Tv, Valley) of the samples of #01, #04, #10, and #11 manufactured in (1) were measured, and the coverage of the cosmetic film was derived after the cosmetic film was applied.

With reference to this, it can be seen that #04 has the highest degree Tt of deposition on the top of the pillar and the highest degree Tv of deposition in the valley, and the remaining samples of #01, #10, and #11 were formed with similar thicknesses. This difference is 10 m, which is a result showing that a significant difference has occurred, and indicating that the degree of stacking may vary depending on the ingredients in the sample. In addition, through the comparison of #1, #10, and #11, it was confirmed that there is a slight difference in thickness depending on the content even with the same ingredients.

(4) PDMS Strain after Application of Cosmetic Film

Figure 4B:
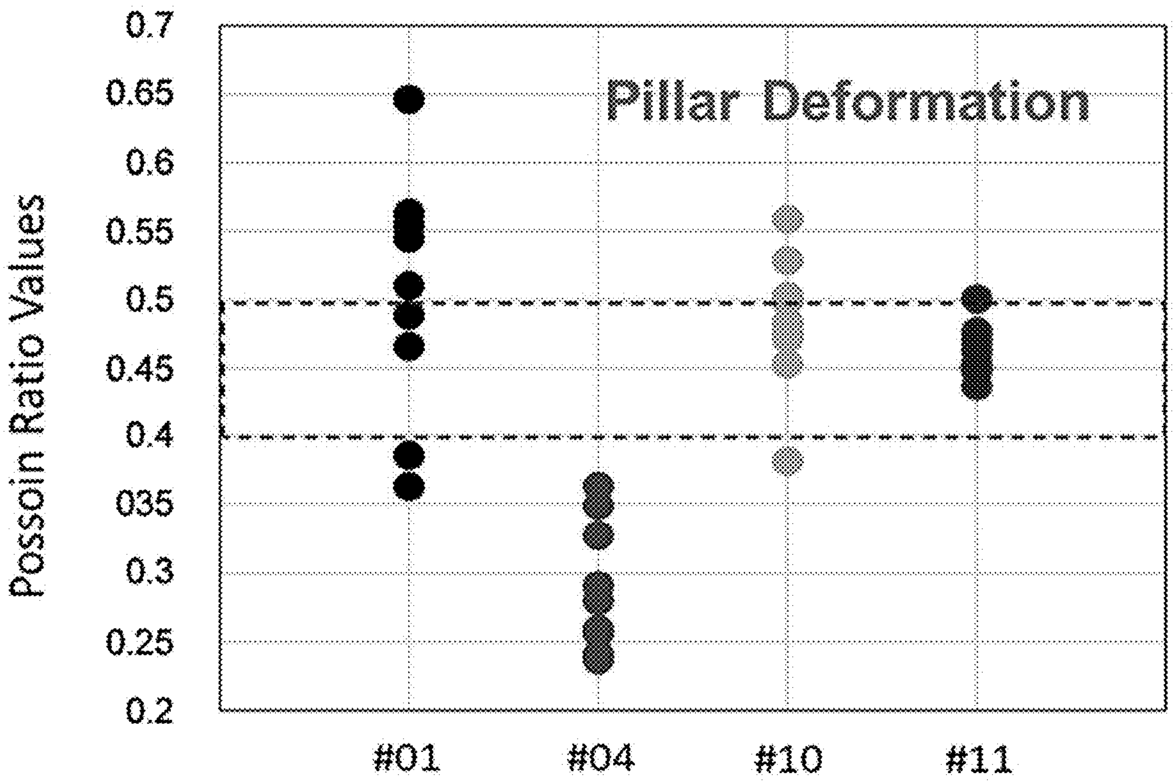
FIG. 4B is a result of measuring PDMS strain obtained through a cross-sectional slice of an X-ray CT image according to one embodiment of the present disclosure.

The PDMS strains of the samples of #01, #04, #10, and #11 manufactured in (1) were calculated according to Equation 1 below, and illustrated in the graph as shown in FIG. 4B.

$$v = -\varepsilon_{lateral} / \varepsilon_{longitudinal} \quad \text{[Equation 1]}$$

In Equation 1, $\Sigma_{longitudinal}=(H_d-H_0)/H_0$, $\varepsilon_{lateral}=(D_d-D_0)/D_0$,

- $D_0$ is a diameter value of a pillar before cosmetic film formation,
- $H_0$ is a height value of a pillar before cosmetic film formation,
- $D_d$ is a diameter value of a pillar after cosmetic film formation, and
- $H_d$ is a height value of a pillar after cosmetic film formation.

In Equation 1, $D_0$ was calculated as 100 μm and $H_0$ as 100 μm.

With reference to FIG. 4B, the PDMS default Poisson's ratio (a value from Equation 1) has a value between 0.4 and 0.5 (red square dotted box). The values shown herewith represent all the Poisson's ratio values that each one PDMS pillar has, with the graph plotting 9 to 10 values for each sample.

For #04, the Poisson's ratio showed a value lower than the default PDMS Poisson's ratio. This means that no deformation of the PDMS occurred even though the cosmetic film was applied. In particular, #04 showed no PDMS deformation, even though the thickest cosmetic film was applied to the top of the pillar and the valleys, as seen above in the coverage data. It may be expected that when the formulation is actually applied to the skin, the user will not feel any pulling, although the formulation was applied with some thickness. However, it was confirmed that the surface roughness was uneven compared to other formulations when the applied coverage images were overall considered, which is expected that users may feel that the applied formulation lacks smoothness.

In contrast it was confirmed that #01, #10, and #11 were applied smoothly and uniformly overall as observed in the coverage image. However, in case of #01, it can be expected that the user will feel strong pulling in consideration that the PDMS Poisson's ratio has a high value compared to others, and to overcome this, the formulation was designed in the direction of alleviating the pulling through adjusting the content of ingredients that may cause pulling, which is #10 and #11.

Finally, it was confirmed that #11 was a suitable formulation that resulted in the least amount of PDMS deformation while evenly distributing the cosmetic film. In addition, it was found that some degree of pulling needs to be present for a smooth application over the skin.

What is claimed is:

1. A PDMS (poly(dimethyl siloxane))-based method of analyzing a cosmetic film formulation, the method comprising:
- preparing a PDMS substrate;
- applying a cosmetic composition to the PDMS substrate to form a cosmetic film; and
- analyzing, using X-ray computed tomography (X-ray CT), a degree of deformation of the PDMS substrate on which the cosmetic film is formed.

2. The method of claim 1, wherein the PDMS substrate has a micropillar pattern formed on an upper portion thereof.

3. The method of claim 2, wherein the micropillar pattern is a regular hexagonal arrangement of columnar pillars, each of which has a height of 20 to 200 μm and a diameter of 20 to 200 μm.

4. The method of claim 3, wherein in the analyzing of the degree of deformation of the PDMS substrate, a thickness of the cosmetic composition applied to a top of the pillar, and a thickness of the cosmetic composition applied to a valley between the pillars are measured.

5. The method of claim 2, wherein in the analyzing of the degree of deformation of the PDMS substrate, a strain value (v) is calculated according to Equation 1 below:

$$v = -\varepsilon_{lateral} / \varepsilon_{longitudinal} \quad \text{[Equation 1]}$$

In Equation 1, $\varepsilon_{longitudinal}=(H_d-H_0)/H_0$, $\varepsilon_{lateral}=(D_d-D_0)/D_0$,

- $D_0$ is a diameter value of a pillar before cosmetic film formation,
- $H_0$ is a height value of a pillar before cosmetic film formation,
- $D_d$ is a diameter value of a pillar after cosmetic film formation, and
- $H_d$ is a height value of a pillar after cosmetic film formation.

6. The method of claim 1, wherein the cosmetic composition includes one or more forms of a liquid, a powder, and a solid.

7. The method of claim 1, wherein a degree of pulling of the cosmetic film is quantified in the analyzing of the degree of deformation of the PDMS substrate.

8. The method of claim 1, wherein the analysis is performed by transmitting X-rays of 10 KeV or higher in the analyzing of the degree of deformation of the PDMS substrate.

9. An artificial skin for cosmetic film formulation analysis comprising:
- a poly(dimethyl siloxane) (PDMS) substrate with a micropillar pattern formed on an upper portion thereof,
- wherein the cosmetic film formulation analysis is quantifying a degree of pulling of a cosmetic film.

10. The artificial skin of claim 9, wherein the micropillar pattern is a regular hexagonal arrangement of columnar pillars, each of which has a height of 20 to 200 μm and a diameter of 20 to 200 μm.

11. The artificial skin of claim 10, wherein the cosmetic film formulation analysis is measuring and analyzing a thickness of a cosmetic composition applied to a top of the pillar, and a thickness of the cosmetic composition applied to a valley between the pillars.

12. The artificial skin of claim 10, wherein the cosmetic film formulation analysis is calculating and analyzing a strain value (v) according to Equation 1 below:

$$\nu = -\varepsilon_{lateral} / \varepsilon_{longitudinal} \quad \text{[Equation 1]}$$

In Equation 1, $\varepsilon_{longitudinal}=(H_d-H_0)/H_0$, $\varepsilon_{lateral}=(D_d-D_0)/D_0$, $D_0$ is a diameter value of a pillar before cosmetic film formation, $H_0$ is a height value of a pillar before cosmetic film formation, $D_d$ is a diameter value of a pillar after cosmetic film formation, and $H_d$ is a height value of a pillar after cosmetic film formation.

13. The artificial skin of claim 9, wherein the cosmetic film formulation analysis is applying a cosmetic composition to the artificial skin and then analyzing a degree of deformation of the PDMS substrate on which the cosmetic film is formed using X-ray computed tomography (X-ray CT).

14. The artificial skin of claim 13, wherein the cosmetic composition includes one or more forms of a liquid, a powder, and a solid.

15. The artificial skin of claim 9, wherein the cosmetic film formulation analysis is analyzing with transmission of X-rays of 10 KeV or more.

* * * * *